US009298561B1

(12) United States Patent
Sawhney et al.

(10) Patent No.: US 9,298,561 B1
(45) Date of Patent: Mar. 29, 2016

(54) SYSTEMS AND METHODS FOR PRIORITIZING RESTORATION SPEED WITH DEDUPLICATED BACKUPS (71) Applicant: Symantec Corporation, Mountain View, CA (US)

(72) Inventors: Sanjay Sawhney, Cupertino, CA (US); Weibao Wu, Vadnais Heights, MN (US); Fanglu Guo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 253 days.

(21) Appl. No.: 14/022,916

(22) Filed: Sep. 10, 2013

(51) Int. Cl.
*G06F 17/30* (2006.01)
*G06F 11/14* (2006.01)

(52) U.S. Cl.
CPC .................................. *G06F 11/1453* (2013.01)

(58) Field of Classification Search
CPC ............ G06F 11/1453; G06F 11/1464; G06F 11/1469; G06F 17/30159; G06F 11/2094; G06F 17/30156
See application file for complete search history.

(56) References Cited

U.S. PATENT DOCUMENTS

| | | | | |
|---|---|---|---|---|
| 8,229,898 | B1 * | 7/2012 | Pype | 707/686 |
| 2008/0059734 | A1 * | 3/2008 | Mizuno | 711/162 |
| 2009/0049260 | A1 * | 2/2009 | Upadhyayula | 711/162 |
| 2010/0125553 | A1 * | 5/2010 | Huang et al. | 707/661 |
| 2012/0078852 | A1 * | 3/2012 | Haselton et al. | 707/654 |
| 2012/0089578 | A1 * | 4/2012 | Lam | 707/692 |
| 2015/0066873 | A1 * | 3/2015 | Voruganti et al. | 707/692 |

OTHER PUBLICATIONS

Mark Lillibridge et al.; Improving Restore Speed for Backup Systems that Use Inline Chunk-Based Deduplication; 11th USENIX conference on File and Storage Technologies (FAST '13); 2013; http://www.hpl.hp.com/personal/Mark_Lillibridge/Fragmentation/final.pdf, as accessed on Jun. 21, 2013.
Deepak Patil et al.; Systems and Methods for Reclaiming Storage Space in Deduplicating Data Systems; U.S. Appl. No. 14/019,971, filed Sep. 6, 2013.

* cited by examiner

*Primary Examiner* — Yuk Ting Choi
(74) *Attorney, Agent, or Firm* — ALG Intellectual Property, LLC (57) ABSTRACT A computer-implemented method for prioritizing restoration speed with deduplicated backups may include (1) receiving a request to store a backup image within a deduplicating data system, (2) evaluating an amount of data segments that match the backup image within a container of deduplicated data segments, (3) identifying a restoration prioritization value that is assigned to the backup image and that correlates with a desired restoration speed for the backup image, (4) determining that the amount of data segments that match the backup image exceeds the restoration prioritization value by a predetermined degree, and (5) referencing previously stored data segments within the container of deduplicated data segments that match the backup image when storing the backup image based on the amount of data segments that match the backup image exceeding the restoration prioritization value by the predetermined degree. Various other methods, systems, and computer-readable media are also disclosed.

20 Claims, 6 Drawing Sheets

SYSTEMS AND METHODS FOR PRIORITIZING RESTORATION SPEED WITH DEDUPLICATED BACKUPS

BACKGROUND

Deduplicating data systems are often able to reduce the amount of storage space needed to store files by recognizing redundant data patterns. For example, a conventional deduplicating data system may reduce the amount of storage space needed to store similar files by dividing the files into data segments and storing only unique data segments. In this example, each deduplicated file stored within the deduplicating data system may be represented by a list of references to those data segments that make up the file.

To protect against data loss, an organization may use a backup system to back up important data. In order to reduce the resources required to store backup images, the organization may store backup images within deduplicating data systems.

Unfortunately, restoring backups from deduplicating data systems may be a slow process. For example, a backup image stored by a deduplicating data system may reference just a few data segments within a given container. In some cases, the overhead of accessing the container may be costly relative to the amount of data for the backup image stored by the container.

Accordingly, the instant disclosure identifies and addresses a need for additional and improved systems and methods for prioritizing restoration speed with deduplicated backups.

SUMMARY

As will be described in greater detail below, the instant disclosure generally relates to systems and methods for prioritizing restoration speed with deduplicated backups by determining a priority assigned to a restoration speed for a pending backup and determining whether to reference existing deduplicated data segments within a container for the pending backup or to store new instances of the deduplicated data segments based on how much of the container the pending backup would reference and the assigned restoration speed priority.

In one example, a computer-implemented method for prioritizing restoration speed with deduplicated backups may include (1) receiving a request to store a backup image within a deduplicating data system, (2) evaluating an amount of data segments that match the backup image within a container of deduplicated data segments used by the deduplicating data system, (3) identifying a restoration prioritization value that is assigned to the backup image and that correlates with a desired restoration speed for the backup image, (4) determining that the amount of data segments that match the backup image exceeds the restoration prioritization value by a predetermined degree, and (5) referencing previously stored data segments within the container of deduplicated data segments that match the backup image when storing the backup image within the deduplicating data system based at least in part on the amount of data segments that match the backup image exceeding the restoration prioritization value by the predetermined degree.

In some examples, evaluating the amount of data segments that match the backup image within the container may include estimating the amount of data segments that match the backup image within the container based on at least one previous backup image stored within the deduplicating data system. Additionally or alternatively, evaluating the amount of data segments that match the backup image within the container may include (1) identifying a previous backup image that was stored within the deduplicating data system and that originated from a same backup target as the backup image, and (2) estimating the amount of data segments that match the backup image within the container based on how many data segments within the container matched the previous backup image. In some examples, evaluating the amount of data segments that match the backup image within the container may include evaluating the amount of data segments that match the backup image within the container relative to a capacity of the container.

In some examples, identifying the restoration prioritization value may include (1) presenting a user interface that comprises an input element for specifying the restoration prioritization value, and (2) receiving, via the user interface, user input that specifies the restoration prioritization value. Additionally or alternatively, identifying the restoration prioritization value may include assigning the restoration prioritization value based on an attribute of a backup job that originated the request to store the backup image within the deduplicating data system.

In one embodiment, the computer-implemented method may further include (1) receiving a request to store an additional backup image within the deduplicating data system, (2) evaluating an amount of data segments that match the additional backup image within the container, (3) identifying an additional restoration prioritization value that is assigned to the additional backup image and that correlates with an additional desired restoration speed for the additional backup image, (4) determining that the amount of data segments that match the additional backup image falls below the additional restoration prioritization value by an additional predetermined degree, and (5) storing at least one new instance of at least one data segment in an additional container instead of referencing an existing instance of the data segment in the container when storing the additional backup image within the deduplicating data system based at least in part on the amount of data segments that match the additional backup image falling below the additional restoration prioritization value by the additional predetermined degree.

In some examples, the computer-implemented method may further include restoring the backup image by retrieving the previously stored data segments from the container used by the deduplicating data system.

In one embodiment, a system for implementing the above-described method may include (1) a receiving module that receives a request to store a backup image within a deduplicating data system, (2) an evaluation module that evaluates an amount of data segments that match the backup image within a container of deduplicated data segments used by the deduplicating data system, (3) an identification module that identifies a restoration prioritization value that is assigned to the backup image and that correlates with a desired restoration speed for the backup image, (4) a determination module that determines that the amount of data segments that match the backup image exceeds the restoration prioritization value by a predetermined degree, (5) a referencing module that references previously stored data segments within the container of deduplicated data segments that match the backup image when storing the backup image within the deduplicating data system based at least in part on the amount of data segments that match the backup image exceeding the restoration prioritization value by the predetermined degree, and (6) at least one processor configured to execute the receiving module, the evaluation module, the identification module, the determination module, and the referencing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a request to store a backup image within a deduplicating data system, (2) evaluate an amount of data segments that match the backup image within a container of deduplicated data segments used by the deduplicating data system, (3) identify a restoration prioritization value that is assigned to the backup image and that correlates with a desired restoration speed for the backup image, (4) determine that the amount of data segments that match the backup image exceeds the restoration prioritization value by a predetermined degree, and (5) reference previously stored data segments within the container of deduplicated data segments that match the backup image when storing the backup image within the deduplicating data system based at least in part on the amount of data segments that match the backup image exceeding the restoration prioritization value by the predetermined degree.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for prioritizing restoration speed with deduplicated backups. As will be explained in greater detail below, by determining a priority assigned to restoration speed for a pending backup and determining whether to reference existing deduplicated data segments within a container for the pending backup or to store new instances of the deduplicated data segments based on how much of the container the pending backup would reference and the assigned restoration speed priority, the systems and methods described herein may enable administrators and/or backup systems to improve the restoration speed of selected backups (e.g., at the cost of backup computing resources such as backup storage). Likewise, these systems and methods may enable administrators and/or backup systems to improve backup speed and/or storage consumption of selected backups (e.g., at the cost of restoration speed).

Figure 1:
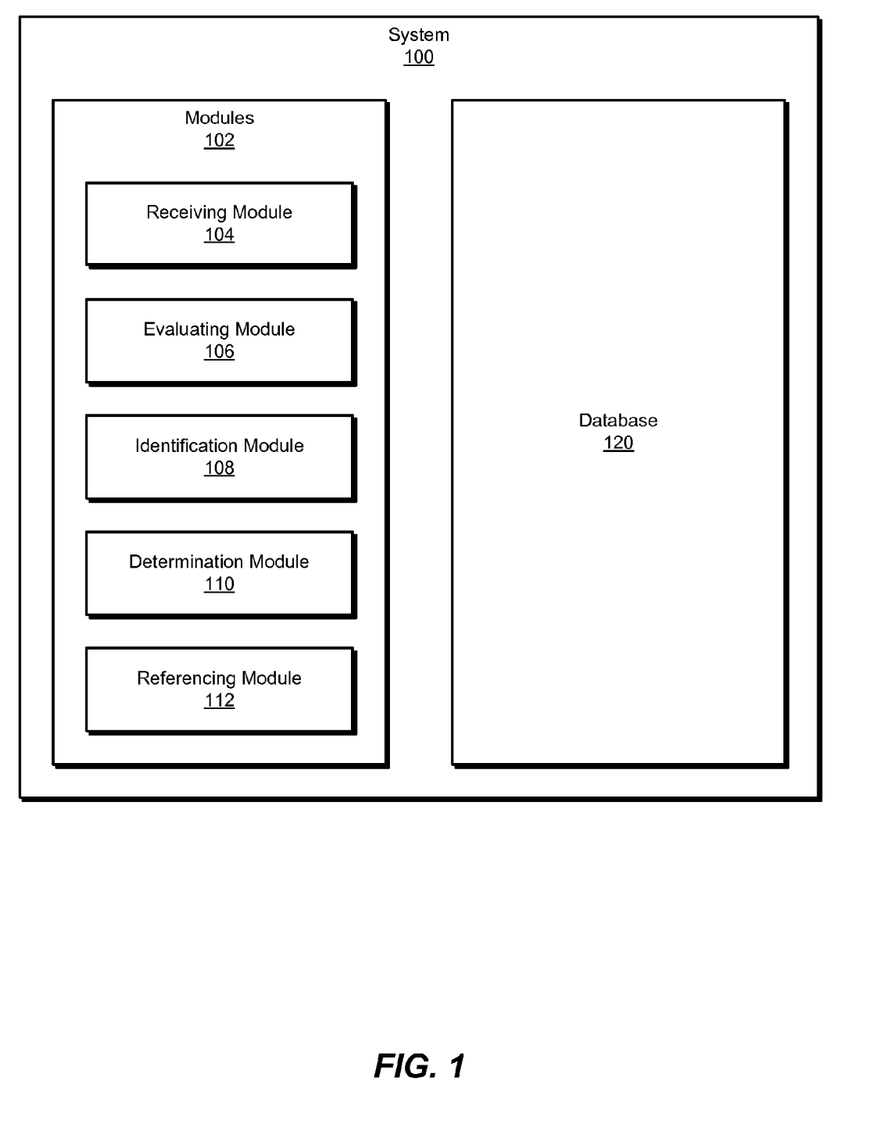
FIG. 1 is a block diagram of an exemplary system for prioritizing restoration speed with deduplicated backups.
Figure 2:
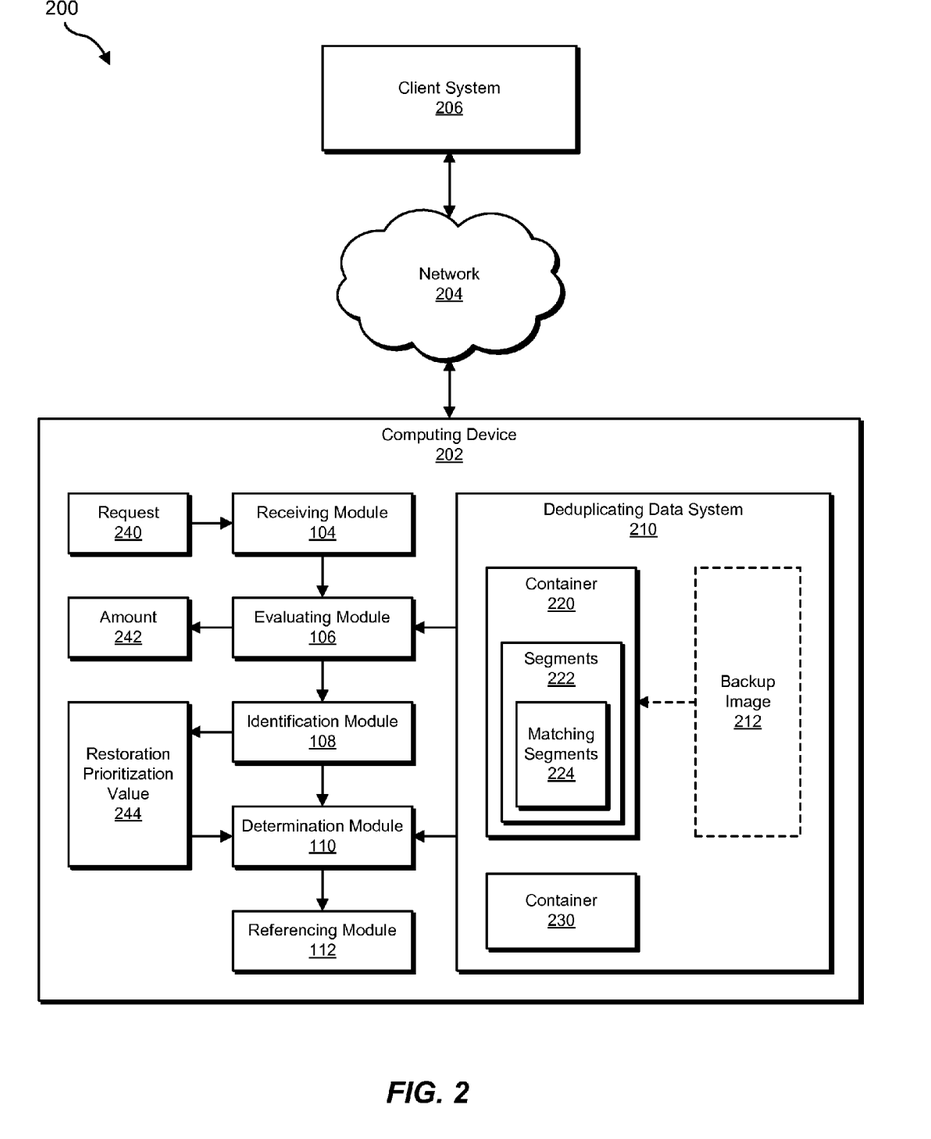
FIG. 2 is a block diagram of an exemplary system for prioritizing restoration speed with deduplicated backups.

The following will provide, with reference to FIGS. 1-2, detailed descriptions of exemplary systems for prioritizing restoration speed with deduplicated backups. Detailed descriptions of corresponding computer-implemented methods will also be provided in connection with FIG. 3. Detailed descriptions of an exemplary deduplicating data system will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for prioritizing restoration speed with deduplicated backups. As illustrated in this figure, exemplary system 100 may include one or more modules 102 for performing one or more tasks. For example, and as will be explained in greater detail below, exemplary system 100 may also include a receiving module 104 that may receive a request to store a backup image within a deduplicating data system. Exemplary system 100 may additionally include an evaluation module 106 that may evaluate an amount of data segments that match the backup image within a container of deduplicated data segments used by the deduplicating data system. Exemplary system 100 may also include an identification module 108 that may identify a restoration prioritization value that may be assigned to the backup image and that correlates with a desired restoration speed for the backup image. Exemplary system 100 may additionally include a determination module 110 that may determine that the amount of data segments that match the backup image exceeds the restoration prioritization value by a predetermined degree. Exemplary system 100 may also include a referencing module 112 that may reference previously stored data segments within the container of deduplicated data segments that match the backup image when storing the backup image within the deduplicating data system based at least in part on the amount of data segments that match the backup image exceeding the restoration prioritization value by the predetermined degree. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more containers of a deduplicating data system and/or one or more backup images that reference containers within the deduplicating data system.

Database 120 may represent portions of a single database or computing device or a plurality of databases or computing devices. For example, database 120 may represent a portion of client system 206 in FIG. 2, computing device 202, computing system 510 in FIG. 5, and/or portions of exemplary network architecture 600 in FIG. 6. Alternatively, database 120 in FIG. 1 may represent one or more physically separate devices capable of being accessed by a computing device, such as client system 206 in FIG. 2, computing device 202, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client system 206 via a network 204. Computing device 202 may be programmed with one or more of modules 102 and/or may store all or a portion of the data in database 120. Additionally or alternatively, client system 206 may be programmed with one or more of modules 102 and/or may store all or a portion of the data in database 120.

In one embodiment, one or more of modules 102 from FIG. 1 may, when executed by at least one processor of computing device 202 and/or client system 206, facilitate computing device 202 and/or client system 206 in prioritizing restoration speed with deduplicated backups. For example, and as will be described in greater detail below, computing device 202 may be configured to store one or more backup images from client system 206. In some examples, one or more of modules 102 may cause computing device 202 and/or client system 206 to prioritize restoration speed with deduplicated backups. For example, and as will be described in greater detail below, receiving module 104 may be programmed to receive a request 240 to store a backup image 212 within a deduplicating data system 210. Evaluation module 106 may be programmed to evaluate an amount 242 of data segments that match backup image 212 within a container 220 of deduplicated data segments 222 used by deduplicating data system 210.

Identification module 108 may be programmed to identify a restoration prioritization value 244 that is assigned to backup image 212 and that correlates with a desired restoration speed for backup image 212. Determination module 110 may be programmed to determine that amount 242 of data segments that match backup image 212 exceeds restoration prioritization value 244 by a predetermined degree. Referencing module 112 may be programmed to reference previously stored data segments within container 220 of deduplicated data segments 222 that match backup image 212 (e.g., matching segments 224) when storing backup image 212 within deduplicating data system 210 based at least in part on amount 242 of data segments that match backup image 212 exceeding restoration prioritization value 244 by the predetermined degree (e.g., instead of storing new instances of matching segments 224 in another container within deduplicating data system 210, such as a container 230).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. In some examples, computing device 202 may represent a backup, storage, and/or deduplicating server, appliance, and/or system that deduplicates data, stores deduplicated data, backups up data, and/or manages deduplicated data.

Client system 206 generally represents any type or form of computing device that is capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. Examples of client system 206 include, without limitation, application servers and database servers configured to provide various database services and/or run certain software applications. In some examples, client system 206 may provide data to computing device 202 to back up, deduplicate, and/or store.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and client system 206.

Figure 3:
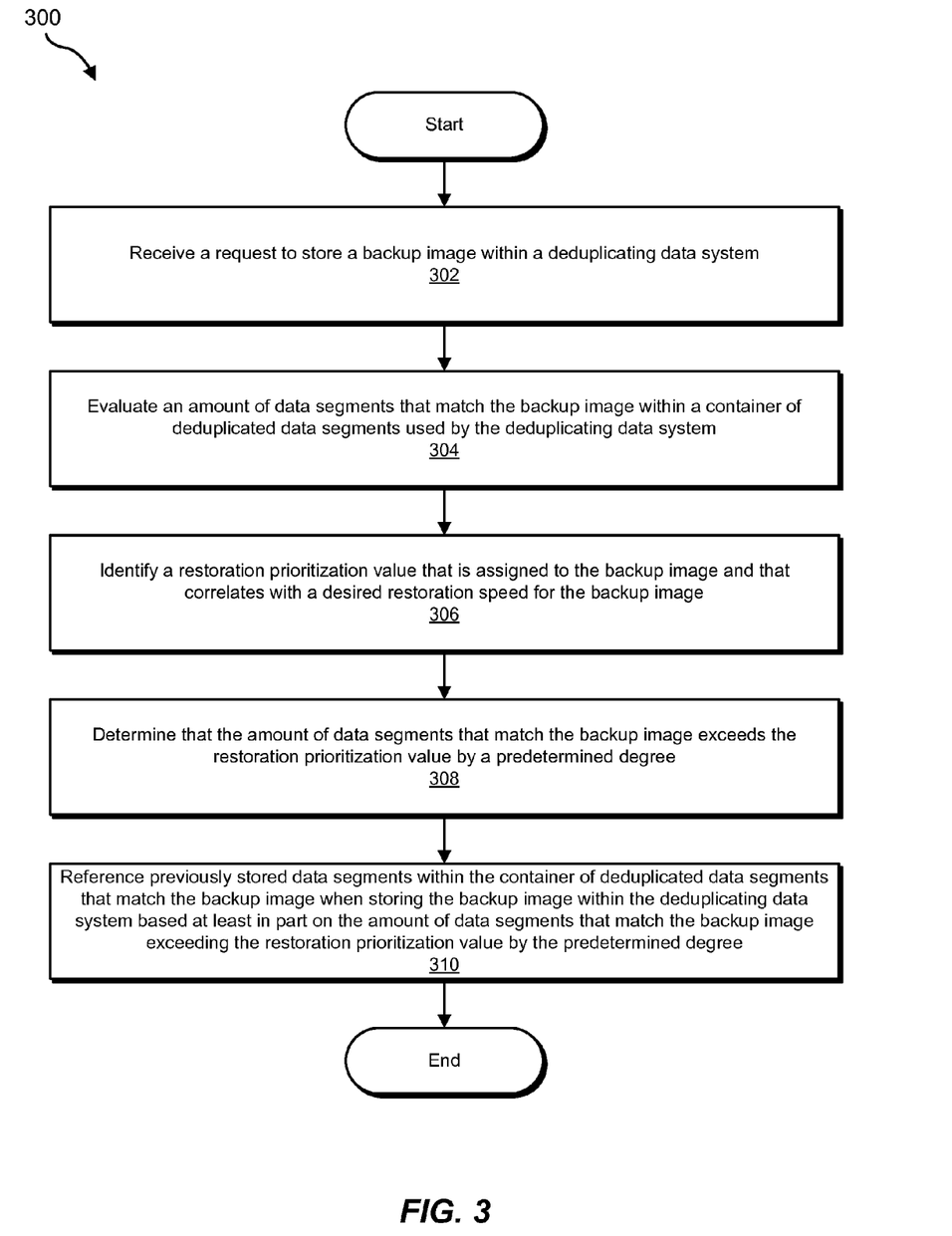
FIG. 3 is a flow diagram of an exemplary method for prioritizing restoration speed with deduplicated backups.

FIG. 3 is a flow diagram of an exemplary computer-implemented method 300 for prioritizing restoration speed with deduplicated backups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive a request to store a backup image within a deduplicating data system. For example, at step 302 receiving module 104 may, as part of computing device 202 in FIG. 2, receive request 240 to store backup image 212 within deduplicating data system 210.

The phrase "backup image," as used herein, generally refers to any type or form of file and/or data set that includes a complete or partial copy of the contents and/or data located on a computing or storage device at a particular point in time. Examples of such backup images include, without limitation, full backup images, incremental backup images, differential backup images, accelerated backup images, deduplicated backup images, synthetic (or "synthesized") backup images, snapshots, combinations of one or more of the same, or any other suitable backup images.

As used herein, the phrase "deduplicating data system" generally refers to any type or form of storage device and/or mechanism capable of deduplicating data, storing deduplicated data, and/or managing deduplicated data. Examples of deduplicating data systems may include, without limitation, SYMANTEC's NETBACKUP PUREDISK, NETBACKUP SURESCALE, BACKUP EXEC, COMMVAULT's SIMPANA SOFTWARE, and/or EMC's DATA DOMAIN. In at least one example, the term "deduplicating data system" may refer to a single-instance storage system. In some examples, a deduplicating data system may store deduplicated data segments that are referenced by backup images.

Receiving module 104 may receive the request to store the backup image within the deduplicating data system in any suitable context. For example, receiving module 104 may receive the request by receiving a communication from a backup client and/or agent. Additionally or alternatively, receiving module 104 may receive the request by analyzing a backup job configuration. In some examples, receiving module 104 may receive the request by intercepting the request.

Figure 4:
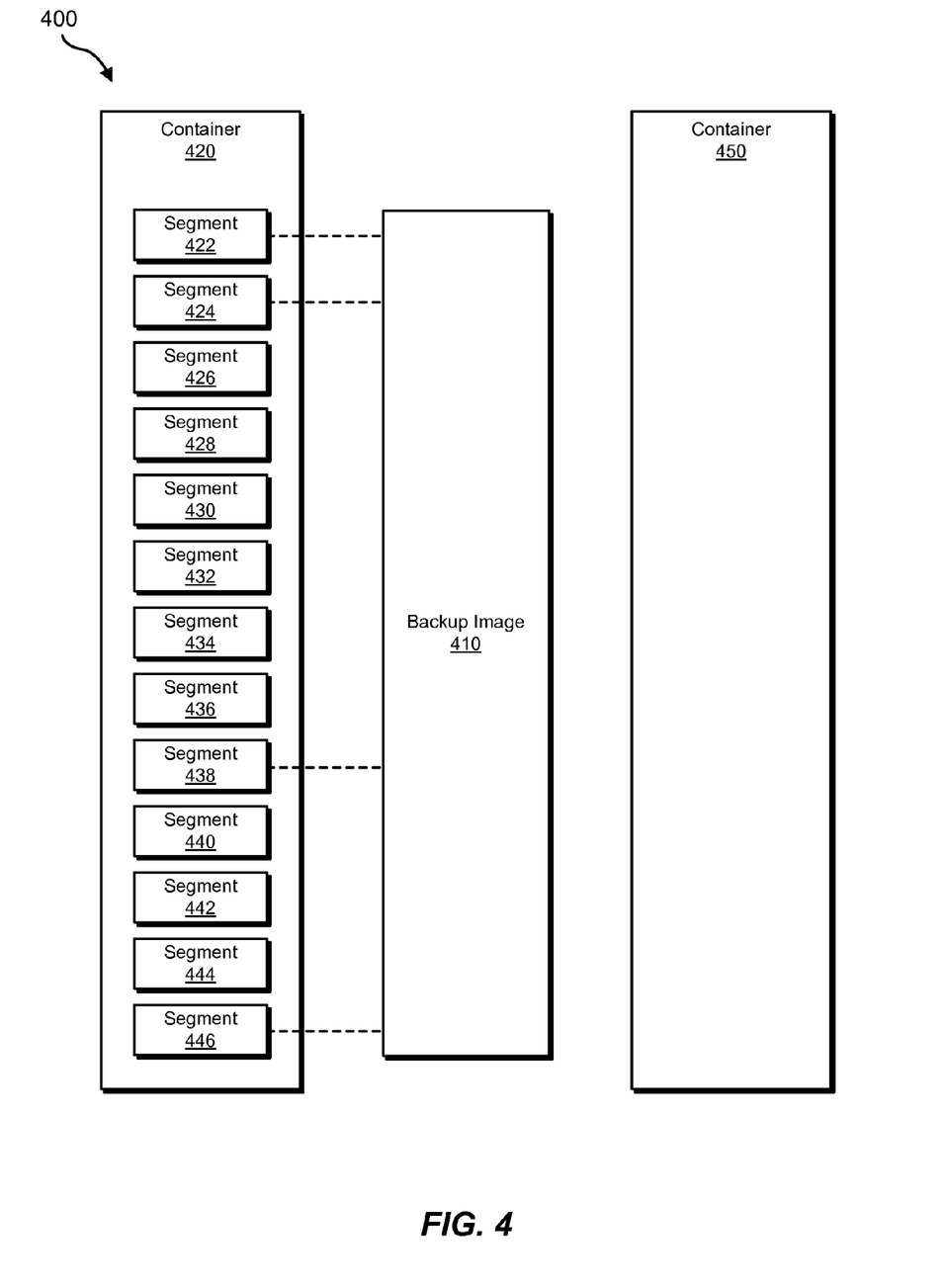
FIG. 4 is a block diagram of an exemplary deduplicating data system.

To provide an example for receiving module 104 performing step 302, FIG. 4 illustrates an exemplary deduplicating data system 400. As shown in FIG. 4, deduplicating data system 400 may include a container 420 and a container 450. Container 420 may store deduplicated data segments 422, 424, 426, 428, 430, 432, 434, 436, 438, 440, 442, 444, and 446. Using FIG. 4 as an example, at step 302 receiving module 104 may receive a request to store a backup image 410 within deduplicating data system 400.

Returning to FIG. 3, at step 304 one or more of the systems described herein may evaluate an amount of data segments that match the backup image within a container of deduplicated data segments used by the deduplicating data system. For example, at step 304 evaluation module 106 may, as part of computing device 202 in FIG. 2, evaluate amount 242 of data segments that match backup image 212 within container 220 of deduplicated data segments 222 used by deduplicating data system 210.

As used herein, the term "container" may refer to any data structure, storage system, and/or location that stores, contains, includes, and/or points to a subset of data segments stored within a deduplicating data system. In some examples, containers may contain or tend to contain data segments from interrelated data objects. For example, if a deduplicating data system is used as part of a backup system, the deduplicating data system may store (or attempt to store, subject to other constraints) the data segments of a given backup image in the same container or set of containers. However, in some cases, a container may store only a small proportion of data segments corresponding to a given backup image.

Evaluation module 106 may evaluate the amount of data segments that match the backup image within the container in any of a variety of ways. In some examples, evaluation module 106 may estimate the amount of data segments within the container that match the backup image. For example, evaluation module 106 may estimate the amount of data segments that match the backup image within the container based on one or more previous backup images stored within the deduplicating data system (e.g., having previously calculated the amount of data segments within the container that match each of the previous backup images when storing each of the previous backup images).

In some examples, evaluation module 106 may evaluate the amount of data segments that match the backup image within the container by (1) identifying a previous backup image that was stored within the deduplicating data system and that originated from the same backup target as the backup image, and (2) estimating the amount of data segments that match the backup image within the container based on how many data segments within the container matched the previous backup image. For example, one or more of the systems described herein may have kept count of the number of data segments within the container that were referenced by the previous backup image when storing the previous backup image.

Evaluation module 106 may determine that the previous backup image originated from the same backup target as the backup image in any suitable manner. For example, evaluation module 106 may determine that the previous backup image and the backup image were produced by the same backup job at different points in time. In some examples, evaluation module 106 may estimate the backup image to have the same amount of data segments matching data segments within the container as the previous backup image. Additionally or alternatively, evaluation module 106 may modify the estimate based on additional information (e.g., an amount of recorded changes to the backup target between the previous backup image and the backup image, an amount of time that passed between the previous backup image and the backup image, etc.).

In some embodiments, evaluation module 106 may evaluate the amount of data segments that match the backup image within the container by evaluating the amount of data segments that match the backup image within the container relative to a capacity of the container. For example, evaluation module 106 may calculate a proportion of the container capacity that is taken up with data segments that match the backup image.

Using FIG. 4 as an example, at step 304 evaluation module 106 may evaluate an amount of data segments within container 420 that match backup image 410. As shown in FIG. 4, segments 422, 424, 438, and 446 may match backup image 410. While container 420 may contain 13 data segments, container 420 may have a capacity to store 16 data segments. Accordingly, evaluation module 106 may determine that backup image 410 matches 25% of the capacity of container 420. In some examples, evaluation module 106 may estimate that backup image 410 matches 25% of the capacity of container 420 by having tracked how many data segments within container 420 matched a similar, previous backup image.

Returning to FIG. 3, at step 306 one or more of the systems described herein may identify a restoration prioritization value that is assigned to the backup image and that correlates with a desired restoration speed for the backup image. For example, at step 306 identification module 108 may, as part of computing device 202 in FIG. 2, identify restoration prioritization value 244 that is assigned to backup image 212 and that correlates with a desired restoration speed for backup image 212.

The restoration prioritization value may include any value, setting, and/or configuration used to determine and/or influence whether to reference deduplicated data segments within a container when storing a backup image in a deduplicating data system. In some examples, the restoration prioritization value may represent an inverse of a backup prioritization value. For example, as will be described in greater detail below, improving the restoration performance of a backup by storing new instances of data segments for the backup instead of references to existing data segments in a container with relatively few data segments corresponding to the backup may reduce the storage efficiency of the backup. Additionally, improving the restoration performance of the backup may reduce the speed and/or resource efficiency of the backup (e.g., by requiring more data segments from the backup image to be sent over a network to the deduplicating data system).

Identification module 108 may identify the restoration prioritization value in any of a variety of ways. For example, identification module 108 may identify the restoration prioritization value by (1) presenting a user interface that comprises an input element for specifying the restoration prioritization value and (2) receiving, via the user interface, user input that specifies the restoration prioritization value. For example, identification module 108 may present a user interface that includes a slider element that sets a higher restoration prioritization value on one end and a lower restoration prioritization value on the other end. As another example, identification module 108 may present a user interface that includes a selection element that allows a user to select a backup as having a high restoration prioritization or having a high backup prioritization.

In some examples, identification module 108 may identify the restoration prioritization value based on an attribute of a backup job that originated the request to store the backup image within the deduplicating data system. For example, identification module 108 may determine that the backup job targets a remote site with limited bandwidth available for backup operations. In this example, identification module 108 may reduce the restoration prioritization value. As another example, identification module 108 may determine that the backup job targets a database in a datacenter and that the backup job stages the backup data for storage on a tape medium. In this example, identification module 108 may increase the restoration prioritization value.

In some examples, different backup images stored within the deduplicating data system may have different assigned restoration prioritization values. For example, each backup image stored within the deduplicating data system may have a separate assigned restoration prioritization value. Accordingly, identification module 108 may identify separate restoration prioritization values for each backup image.

Returning to FIG. 3, at step 308 one or more of the systems described herein may determine that the amount of data segments that match the backup image exceeds the restoration prioritization value by a predetermined degree. For example, at step 308 determination module 110 may, as part of computing device 202 in FIG. 2, determine that amount 242 of data segments that match backup image 212 exceeds restoration prioritization value 244 by a predetermined degree.

Determination module 110 may compare the amount of data segments that match the backup image with the restoration prioritization value according to any of a variety of formulas. For example, determination module 110 may compare the proportion of matching data segments within the container relative to the capacity of the container to the restoration prioritization value. In some examples, determination module 110 may calculate a difference between the proportion of matching data segments and the restoration prioritization value, a proportional relationship between the proportion of matching data segments and the restoration prioritization value, and/or the relationship between the proportion of matching data segments and the restoration prioritization value according to a non-linear function. Generally, determination module 110 may use any formula where a relatively higher restoration prioritization value and/or a relatively lower amount of data segments in the container matching the backup image tends to a determination of not referencing the container for the backup image while a relatively lower restoration prioritization value and/or a relatively higher amount of data segments in the container matching the backup image tends to a determination of referencing the container for the backup image.

In some examples, as will be discussed in greater detail below, determination module 110 may compare the amount of data segments within the container that match an additional backup image and determine that the amount of data segments that match the additional backup image falls below an additional restoration prioritization value assigned to the additional backup image.

Returning to FIG. 3, at step 310 one or more of the systems described herein may reference previously stored data segments within the container of deduplicated data segments that match the backup image when storing the backup image within the deduplicating data system based at least in part on the amount of data segments that match the backup image exceeding the restoration prioritization value by the predetermined degree. For example, at step 310 referencing module 112 may, as part of computing device 202 in FIG. 2, reference previously stored data segments within container 220 of deduplicated data segments 222 that match backup image 212 (e.g., matching segments 224) when storing backup image 212 within deduplicating data system 210 based at least in part on amount 242 of data segments that match backup image 212 exceeding restoration prioritization value 244 by the predetermined degree.

Referencing module 112 may reference the previously stored data segments within the container when storing the backup image in any suitable manner. For example, referencing module 112 may reference the previously stored data segments by determining that a fingerprint (e.g., a hash, a unique identifier, etc.) of a data segment of the backup image matches a fingerprint of a data segment within the container. In this example, referencing module 112 may prevent a request to a backup agent and/or backup client that the backup agent and/or client send the data segment of the backup image to the deduplicating data system.

As mentioned earlier, in some examples, systems described herein may have compared the amount of data segments within the container that match an additional backup image and determined that the amount of data segments that match the additional backup image falls below an additional restoration prioritization value assigned to the additional backup image. In these examples, referencing module 112 may store at least one new instance of at least one data segment in an additional container instead of referencing an existing instance of the data segment in the container when storing the additional backup image within the deduplicating data system based at least in part on the amount of data segments that match the additional backup image falling below the additional restoration prioritization value by the additional predetermined degree. In these examples, referencing module 112 may thereby reduce the number of containers to be referenced by the backup image and improve the speed of any future restoration operation.

In some examples, systems described herein may restore the backup image by retrieving the previously stored data segments from the container used by the deduplicating data system. In certain embodiments, such as the example discussed above, these systems may restore the additional backup image mentioned above by retrieving the new instances of the data segments from the additional container.

Using FIG. 4 as an example of referencing module 112 performing step 310, referencing module 112 may determine whether to reference segments 422, 424, 438, and 446 within container 420 when storing backup image 410 or to create new instances of segments 422, 424, 438, and 446 (e.g., in another container, such as container 450) based on the restoration prioritization value and the amount of the segments (e.g., in proportion to the capacity of container 420).

As explained above in connection with method 300 in FIG. 3, the systems described herein may define a priority for restore speed (e.g., from 0% to 100%) to enable per-backup adjustable backup and restore speed balance. These systems may use the priority percentage to decide whether old data is to be referenced by a given backup. When the restore speed priority is 0%, the backup speed priority may be the highest. In this case, these systems may reference old data even if the container data utilization is low. When the restore speed priority is 100%, backup speed priority may be the lowest. In this case, these systems may reference old data when the container data utilization is high.

For each backup, these systems may configure or automatically deduce a restore speed priority value. Before execution of each backup, the client may read the container data utilization information from the server. Container data utilization may correspond to the ratio of data in the container useful to the backup to the capacity of the container. During the backup process, when the client wants to reference old data in previous backups, these systems may compare the container data utilization with the restore speed priority number. If the container data utilization is no less than the restore priority, these systems may reference old data. Otherwise, these systems may store duplicate instances of the old data.

In this manner, higher container data utilization may lead to higher restore speed, but lower backup speed. Lower container data utilization may lead to lower restore speed, but higher backup speed (e.g., because less data may be sent for the backup). In some examples, these systems may not compare the restore priority directly with the container data utilization. Instead, these systems may use a non-linear map to compare the restore priority with the container data utilization.

Figure 5:
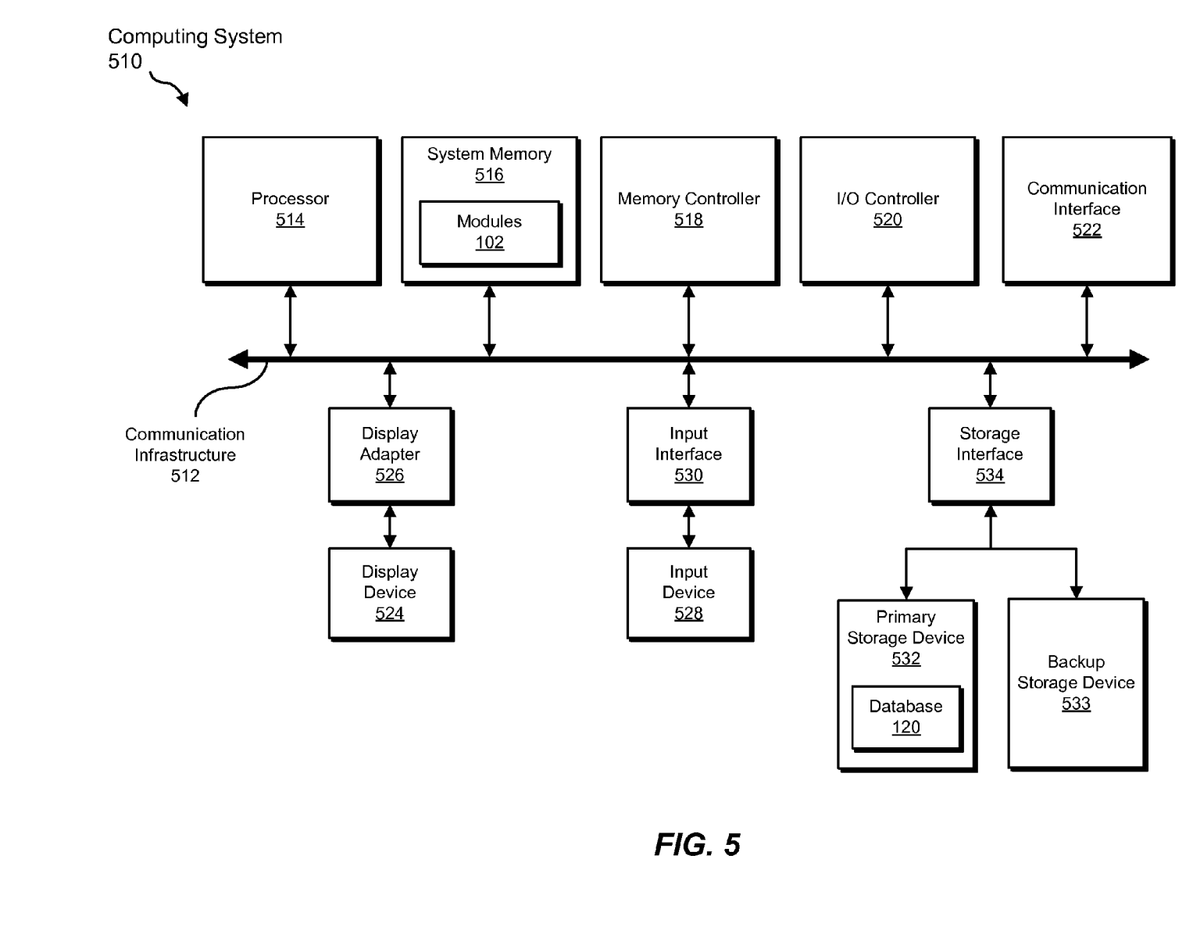
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
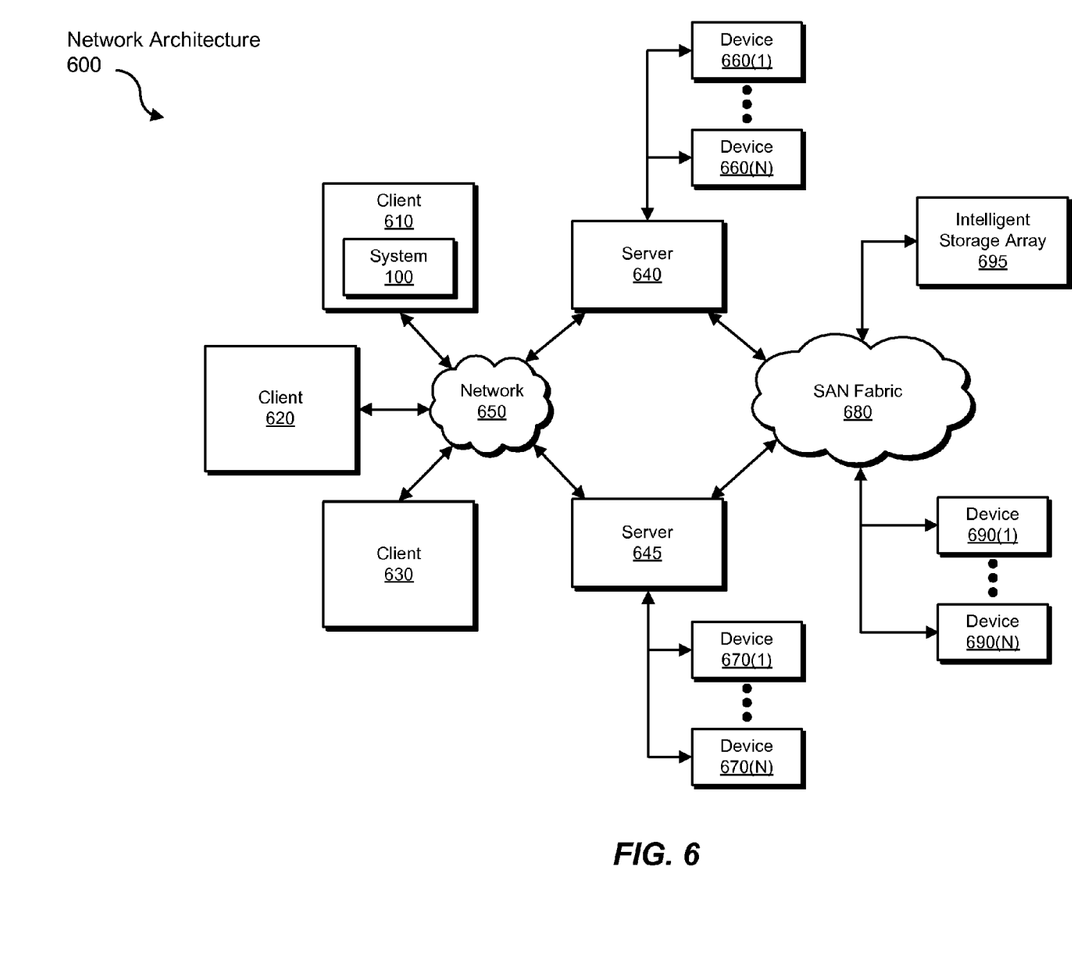
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for prioritizing restoration speed with deduplicated backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a restoration prioritization value to be transformed, transform the restoration prioritization value into a deduplication determination, output a result of the transformation to a deduplicating data system, use the result of the transformation to reference data within a container and/or to store new instances of data within a deduplicating data system, and store the result of the transformation to a deduplicating data system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for prioritizing restoration speed with deduplicated backups,
    at least a portion of the method being performed by a computing device comprising at least one processor, the method comprising:
    receiving a request to store a backup image within a deduplicating data system;
    evaluating an amount of data segments that match the backup image within a container of deduplicated data segments used by the deduplicating data system;
    identifying a restoration prioritization value that is separately assigned to the backup image and that indicates a degree of priority placed on restoration performance of the backup image over backup performance of the backup image, wherein restoration performance comprises at least one of speed with which restoration is completed and resource use of restoration and backup performance comprises at least one of speed with which backup is completed and resource use of backup;
    determining that the amount of data segments that match the backup image exceeds the restoration prioritization value by a predetermined degree;
    referencing previously stored data segments within the container of deduplicated data segments that match the backup image when storing the backup image within the deduplicating data system based at least in part on the amount of data segments that match the backup image exceeding the restoration prioritization value by the predetermined degree.

2. The computer-implemented method of claim 1, wherein evaluating the amount of data segments that match the backup image within the container comprises estimating the amount of data segments that match the backup image within the container based on at least one previous backup image stored within the deduplicating data system.

3. The computer-implemented method of claim 1, wherein evaluating the amount of data segments that match the backup image within the container comprises:
    identifying a previous backup image that was stored within the deduplicating data system and that originated from a same backup target as the backup image;
    estimating the amount of data segments that match the backup image within the container based on how many data segments within the container matched the previous backup image.

4. The computer-implemented method of claim 1, wherein evaluating the amount of data segments that match the backup image within the container comprises evaluating the amount of data segments that match the backup image within the container relative to a capacity of the container.

5. The computer-implemented method of claim 1, wherein identifying the restoration prioritization value comprises:
    presenting a user interface that comprises an input element for specifying the restoration prioritization value;
    receiving, via the user interface, user input that specifies the restoration prioritization value.

6. The computer-implemented method of claim 1, wherein identifying the restoration prioritization value comprises assigning the restoration prioritization value based on an attribute of a backup job that originated the request to store the backup image within the deduplicating data system.

7. The computer-implemented method of claim 1, further comprising:
receiving a request to store an additional backup image within the deduplicating data system;
evaluating an amount of data segments that match the additional backup image within the container;
identifying an additional restoration prioritization value that is assigned to the additional backup image and that correlates with an additional desired restoration speed for the additional backup image;
determining that the amount of data segments that match the additional backup image falls below the additional restoration prioritization value by an additional predetermined degree;
storing at least one new instance of at least one data segment in an additional container instead of referencing an existing instance of the data segment in the container when storing the additional backup image within the deduplicating data system based at least in part on the amount of data segments that match the additional backup image falling below the additional restoration prioritization value by the additional predetermined degree.

8. The computer-implemented method of claim 1, further comprising restoring the backup image by retrieving the previously stored data segments from the container used by the deduplicating data system.

9. A system for prioritizing restoration speed with deduplicated backups, the system comprising:
a receiving module that receives a request to store a backup image within a deduplicating data system;
an evaluation module that evaluates an amount of data segments that match the backup image within a container of deduplicated data segments used by the deduplicating data system;
an identification module that identifies a restoration prioritization value that is assigned to the backup image and that indicates a degree of priority placed on restoration performance of the backup image over backup performance of the backup image, wherein restoration performance comprises at least one of speed with which restoration is completed and resource use of restoration and backup performance comprises at least one of speed with which backup is completed and resource use of backup;
a determination module that determines that the amount of data segments that match the backup image exceeds the restoration prioritization value by a predetermined degree;
a referencing module that references previously stored data segments within the container of deduplicated data segments that match the backup image when storing the backup image within the deduplicating data system based at least in part on the amount of data segments that match the backup image exceeding the restoration prioritization value by the predetermined degree;
at least one processor configured to execute the receiving module, the evaluation module, the identification module, the determination module, and the referencing module.

10. The system of claim 9, wherein the evaluation module evaluates the amount of data segments that match the backup image within the container by estimating the amount of data segments that match the backup image within the container based on at least one previous backup image stored within the deduplicating data system.

11. The system of claim 9, wherein the evaluation module evaluates the amount of data segments that match the backup image within the container by:
identifying a previous backup image that was stored within the deduplicating data system and that originated from a same backup target as the backup image;
estimating the amount of data segments that match the backup image within the container based on how many data segments within the container matched the previous backup image.

12. The system of claim 9, wherein the evaluation module evaluates the amount of data segments that match the backup image within the container by evaluating the amount of data segments that match the backup image within the container relative to a capacity of the container.

13. The system of claim 9, wherein the identification module identifies the restoration prioritization value by:
presenting a user interface that comprises an input element for specifying the restoration prioritization value;
receiving, via the user interface, user input that specifies the restoration prioritization value.

14. The system of claim 9, wherein the identification module identifies the restoration prioritization value by assigning the restoration prioritization value based on an attribute of a backup job that originated the request to store the backup image within the deduplicating data system.

15. The system of claim 9, wherein:
the receiving module further receives a request to store an additional backup image within the deduplicating data system;
the evaluation module further evaluates an amount of data segments that match the additional backup image within the container;
the identification module further identifies an additional restoration prioritization value that is assigned to the additional backup image and that correlates with an additional desired restoration speed for the additional backup image;
the determination module further determines that the amount of data segments that match the additional backup image falls below the additional restoration prioritization value by an additional predetermined degree;
the referencing module further stores at least one new instance of at least one data segment in an additional container instead of referencing an existing instance of the data segment in the container when storing the additional backup image within the deduplicating data system based at least in part on the amount of data segments that match the additional backup image falling below the additional restoration prioritization value by the additional predetermined degree.

16. The system of claim 9, further comprising a restoring module that restores the backup image by retrieving the previously stored data segments from the container used by the deduplicating data system.

17. A non-transitory computer-readable-storage medium comprising one or more computer-readable instructions that, when executed by at least one processor of a computing device, cause the computing device to:
receive a request to store a backup image within a deduplicating data system;
evaluate an amount of data segments that match the backup image within a container of deduplicated data segments used by the deduplicating data system;

identify a restoration prioritization value that is assigned to the backup image and that indicates a degree of priority placed on restoration performance of the backup image over backup performance of the backup image, wherein restoration performance comprises at least one of speed with which restoration is completed and resource use of restoration and backup performance comprises at least one of speed with which backup is completed and resource use of backup;

determine that the amount of data segments that match the backup image exceeds the restoration prioritization value by a predetermined degree;

reference previously stored data segments within the container of deduplicated data segments that match the backup image when storing the backup image within the deduplicating data system based at least in part on the amount of data segments that match the backup image exceeding the restoration prioritization value by the predetermined degree.

18. The non-transitory computer-readable-storage medium of claim 17, wherein the one or more computer-readable instructions cause the computing device to evaluate the amount of data segments that match the backup image within the container by estimating the amount of data segments that match the backup image within the container based on at least one previous backup image stored within the deduplicating data system.

19. The non-transitory computer-readable-storage medium of claim 17, wherein the one or more computer-readable instructions cause the computing device to evaluate the amount of data segments that match the backup image within the container by:

identifying a previous backup image that was stored within the deduplicating data system and that originated from a same backup target as the backup image;

estimating the amount of data segments that match the backup image within the container based on how many data segments within the container matched the previous backup image.

20. The non-transitory computer-readable-storage medium of claim 17, wherein the one or more computer-readable instructions cause the computing device to evaluate the amount of data segments that match the backup image within the container by evaluating the amount of data segments that match the backup image within the container relative to a capacity of the container.

* * * * *